July 26, 1960
B. O. KRUEGER ET AL
2,946,403
CONCENTRATED FORMALDEHYDE SOLUTION
Filed Aug. 13, 1958
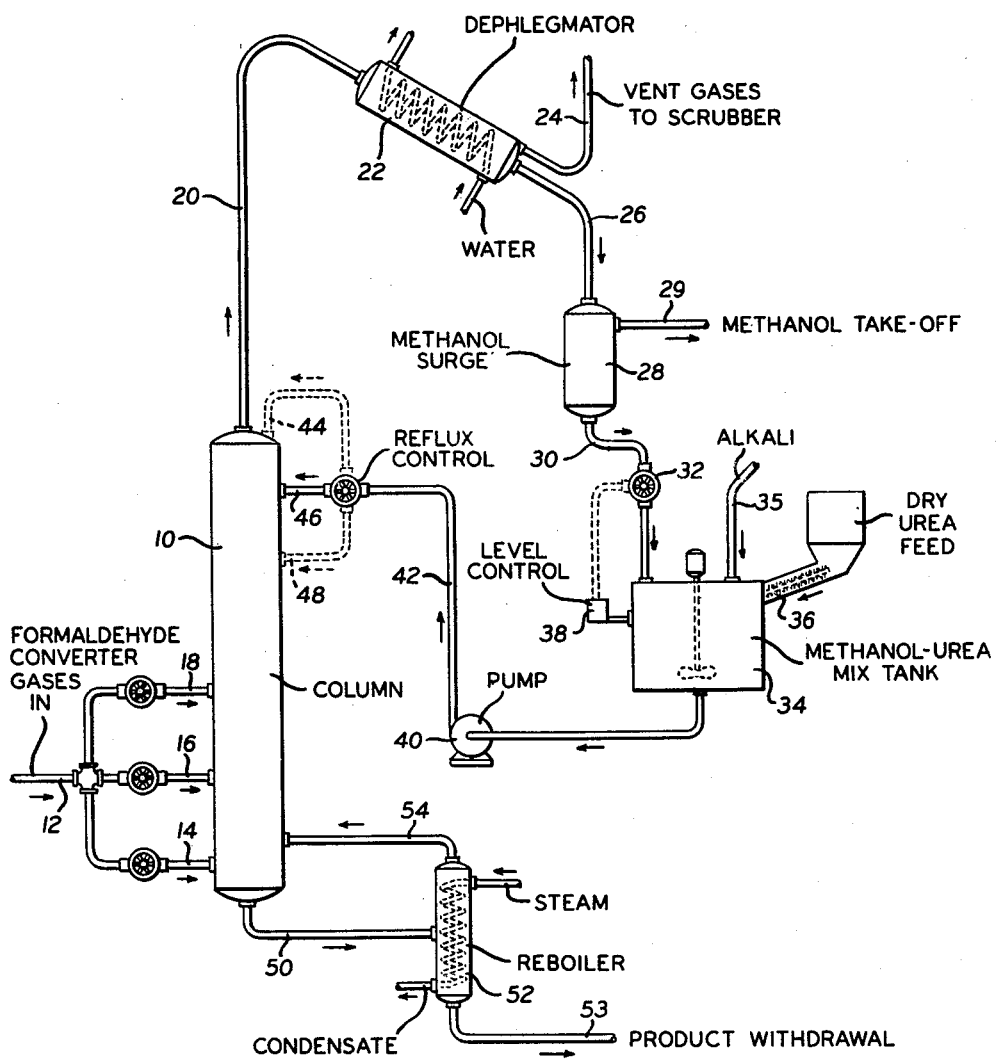
INVENTORS
BRUNO O. KRUEGER
BENJAMIN B. BUTLER
JOHN M. HINE
BY
ROBERT CALVERT
ATTORNEY United States Patent Office 2,946,403
Patented July 26, 1960

2,946,403

CONCENTRATED FORMALDEHYDE SOLUTION

Bruno Otto Krueger, Benjamin B. Butler, and John M. Hine, Seattle, Wash., assignors to The Borden Company, New York, N.Y., a corporation of New Jersey Filed Aug. 13, 1958, Ser. No. 754,858

8 Claims. (Cl. 183—115)

This invention relates to making a stable concentrated solution of formaldehyde in aqueous urea or the like with high efficiency of recovery of the formaldehyde used and a high concentration of the resulting solution.

In a representative run in which the formaldehyde was used in the form of furnace gas from methanol conversion containing 30.5% of formaldehyde, the recovery was complete to within the accuracy of the weighings and analyses. Of this total, 95% of the formaldehyde appeared in the form of a solution containing 83.5% by weight of urea and formaldehyde, with a formaldehyde content of 55.6% in the form of such combination with urea that the formaldehyde did not separate, as paraformaldehyde or otherwise, on cooling the solution to the lowest winter temperatures. The concentrated solution may be shipped with a water content of only about 16%–17%, with attendant saving in transportation cost over that for the less concentrated solutions of commerce, and then mixed with additional urea at the place of use in making urea-formaldehyde resins.

Briefly stated the invention comprises the absorption of gaseous formaldehyde by passing the formaldehyde upwardly and in intimate contact with a descending solution of urea, melamine, or the like, the solvent therefor consisting principally of water in the lower part of the column and, in the upper part of the column, largely of a $C_1$-$C_4$ alcohol or a water soluble organic liquid that is a better solvent for formaldehyde and a poorer solvent for urea than water is. In the commercial embodiment, the invention comprises passing the formaldehyde gas upwardly through a heated fractionating column in counter current relationship to a solution of urea in an alcohol or mixed water and an alcohol. Vapor of the selected alcohol rises to a reflux so that the upper part of the column contains a higher concentration of the said alcohol than does the lower part of the column. A concentrated solution of the formaldehyde in the aqueous urea acceptor solution is withdrawn from the bottom of the column.

The invention will be illustrated in connection with the attached drawing to which reference is made. Parts of the apparatus that are not shown in detail are conventional.

There are shown fractionating column 10, a connection such as pipe 12 for delivering a gaseous mixture containing formaldehyde to the column at a position 14 near the bottom or at other positions 16 and 18 between the bottom and approximately the middle of the column, the vapor line 20 delivering vapors to the dephlegmator 22 with vent 24 leading to conventional scrubber equipment (not shown), and outlet 26 delivering condensed liquid to a surge tank 28 for such liquid with draw-off line 30 to valve 32 from which the liquid condensate passes to a mixing tank 34 into which dry urea is supplied at position 36 and alkali solution through 35, the tank 34 having standard level control equipment 38. From this tank the resulting alkalinized solution of the urea in the alcohol goes to pump 40 for delivering a measured amount of the solution through line 42 as a reflux to the column. This reflux enters the column at positions 44, 46, and 48, all of which are either at the top of the column or between the top and the middle thereof, and in all cases above the level at which the formaldehyde gas is introduced into the column. Line 50 delivers material from the bottom of the column to the reboiler equipped with usual steam heating coils (or shell) provided with vapor outlet 54 by which vaporized formaldehyde and organic solvent, if any remain, are returned to the column near the bottom thereof, along with some steam.

The operation of the equipment will be further illustrated in connection with the use of formaldehyde gas direct from a converter (sometimes called burner or furnace) in which methanol is converted to formaldehyde by oxidation, dehydrogenation, or both and the organic solvent used is methanol. The fractionating column in this case is packed with ceramic saddles or rings such as commonly used in packed fractionating towers. The column of liquid that moves downwardly over the packing is not a continuous mass of liquid but a series of liquid films wetting the tower packing. Methanol and urea are charged to the mixing tank 34 in proportion to provide 300 grams of the urea for 3000 ml. of the resulting solution. The pump 40 is then started and the said solution is delivered through line 42 to a position near the top of the fractionating column, at such a rate as to wet the surfaces of the saddles in the column and keep them continuously wet with the urea solution.

The formaldehyde converter gas is introduced through line 12 and the introduction of the methanol urea solution and the formaldehyde gas is made continuously, at such rates as to provide about the proportions in which the formaldehyde and urea are to appear in the final product delivered through line 53. The effluent from the bottom of the column into the reboiler is there subjected to steam heating sufficient to distil therefrom substantially all methanol reaching the reboiler and also some of the remaining, volatilizable formaldehyde, and a part of the water present, these materials being re-used, as by being returned through line 54 to the column and acting with the hot furnace gas to heat the liquid at the lower end of the column to a temperature above the boiling point of methanol. As a result the methanol vapors rise through the column. The methanol becomes concentrated in the upper part thereof, absorbs formaldehyde there available, and passes in part through the dephlegmator from which both are returned eventually by pump 40 to provide the solvent for the urea and also reflux at the top of the fractionating column.

The alcoholic urea solution, on the other hand, works downward in the column, counter current to the ascending stream of gas in which the formaldehyde is originally introduced. On its way downward, the alcoholic urea solution leaves the methanol zone at or near the top of the column, with steady absorption of formaldehyde, and enters the water rich, higher temperature zone towards the bottom. The water there is essentially a condensate from the converter gas or is added with the alcoholic urea solution in case a less concentrated product is to be made and withdrawn from the line 53. Constantly increasing temperatures downwardly in the column cause gradual evaporation of the methanol. The urea, together with the absorbed formaldehyde, changes over into an aqueous solution.

The solubility of urea in water at approximately 20° C. is 108 g. for 100 of water. The solubility in methanol at 30° C. is only about 28 g. The solubility of urea in other $C_1$-$C_4$ alcohols is much lower than in methanol.

As methanol recovered from the system builds up to an amount more than required, the surplus methanol may be drawn off from the methanol take-off line 29. This build-up of methanol is due to the unconverted methanol content of the furnace gases supplied through line 12.

This methanol so drawn off may contain some formaldehyde and may be used to advantage in the conversion plant in which the methanol is oxidized and dehydrogenated to formaldehyde, to provide the furnace gas for line 12.

As to materials used, the formaldehyde may be that from any usual source, as by distillation from commercial paraformaldehyde or from a commercial aqueous solution of formaldehyde. We find a very satisfactory and economical source of the formaldehyde to be the furnace gas direct from the methanol conversion furnaces. Such a gas that we have used is of the following composition:

| | Percent by weight |
|---|---|
| Formaldehyde gas | 30.5 |
| Water vapor | 13.8 |
| Methanol, unconverted | 11.5 |
| Inert gases | 44.2 |

In this gas from the hot conversion furnaces the formaldehyde is at least 50% and ordinarily is substantially completely in monomeric and non-hydrated form.

Urea or melamine serves in the solution in column 10 as the formaldehyde acceptor. While other alternative nitrogen compounds that give aminoplast resins or intermediate methylol compositions with formaldehyde may be used, urea is particularly satisfactory for the purpose, the lowest in price, and therefore recommended for our purpose.

The organic solvent used for introduction of the solution of acceptor and for absorbing the last of the formaldehyde in the top of the column 10 and in the dephlegmator must be one that is soluble in water or at least dispersible therein so that the water may have access to the urea in the said solvent and extract the urea therefrom. It must be one that is lower in boiling point than water, i.e. distillable from water in a mixture containing more of the organic solvent in the vapor phase than of water. Examples of materials that meet these requirements and that may be used are methanol, ethanol, isopropanol, n-propanol, and 3-butanol. We obtain particularly satisfactory results when the alcohol used is methanol.

The organic liquid selected should be a better solvent than water for formaldehyde, that is, should dissolve the formaldehyde faster than water, show higher retention, or both. The retentivity decreases removal of formaldehyde by residual gases passing through the solution. This retentivity for formaldehyde is considered to be due in part to the formation of a hemiformal.

To decompose the methanol-formaldehyde combination (presumably in part a formal), so that the two components may be separated by distillation, we maintain a reboiler temperature between 100° and 120° C.

When the formaldehyde is supplied in the form of gases from the furnaces or methanol converters, the gases will contain a small proportion of formic acid. If it is desirable to neutralize this formic acid there may be used an alkali. This alkali is ordinarily a water soluble alkali metal hydroxide or carbonate or amine such as triethanolamine. It is introduced into the system at any convenient position, as through the line 35.

As to proportions, the urea may be varied as between 30–60 parts for 100 of the formaldehyde. A representative ratio in the finished stable solution is 1 mole of urea to 4 of formaldehyde. Melamine used is also 30–60 parts.

Water is introduced as it occurs in the gas in which the formaldehyde is supplied or is added separately to make a total of about 20–65 parts for 100 of the urea used and 10–30 for 100 of the concentrated solution constituting the finished product.

The alkali is added in amount to establish the pH at the desired level, as for instance within the range 8–12 at the top of column 10, that is, at the upper level of the urea and alcohol solution introduced as shown. Ordinarily we add the alkali in amount to adjust the pH at this position to 10–11.

As to conditions of operation, the gases, when from the methanol converter, are introduced at a temperature above the dew point of condensables therein, as at about 120°–400° C. and normally about 130°–275° C., through inlets 14, 16, or 18.

The temperature of the liquid in the column is maintained below the boiling point of water except at positions adjacent to the introduction of the hot furnace gases. In a typical run, the converter gases came in at the point 18, the height of column used was 4 feet and inside diameter approximately 1.5 inches, the tower packing was 6 mm. ceramic berl saddles, the column efficiency approximately equivalent to 8–10 theoretical trays and the temperature readings in the column liquid were as follows:

| | °C. |
|---|---|
| 1 foot up in the packing above the bottom | 94–96 |
| 2 feet up, near header gas feed 18 | 120–125 |
| 3 feet up | 84–94 |
| Head temperature in vapor | 60–65 |

In general the temperature at the lower exit end of the column is kept below the boiling point of water but above the boiling point of the organic solvent. The temperature at the head of the column is maintained at approximately the refluxing point of the organic solvent so that the vapors thereof pass to the dephlegmator.

The rate of flow of the liquid through the reboiler and the supply of heat to the reboiler are so adjusted that some of the remaining volatile formaldehyde as well as any organic solvent present are distilled from the liquid in the reboiler and returned to the column through the line 54.

The invention will be further illustrated by description in connection with the specific examples of the practice of it. In these examples and elsewhere herein all proportions are expressed as parts by weight unless specifically stated to the contrary.

EXAMPLE 1

A solution of 300 g. of urea in 2,260 of pure methanol was prepared, the total volume being 3,000 ml. The pH was adjusted to 10 to 11 by the addition of sodium hydroxide solution. This solution was then fed to the top of a 4 ft. x 1.5 in. packed absorption distillation tower, through a flow meter at a rate of 8.33 ml. per minute as reflux.

Furnace gas from the conversion of methanol to formaldehyde was introduced through inlet 18 and its flow rate adjusted to 0.12 c.f.m. (about 3,400 ml.) simultaneously with the introduction of the reflux solution at the top of the tower.

About 20 minutes after the start, sufficient liquid had accumulated in the reboiler to permit its operation. The heat input was then slowly increased and a constant liquid level maintained while excess methanol distilled back into the tower, to be withdrawn as methanol take-off from the condenser 22. A progressively lower concentration of methanol in the reboiler made room for further down coming product, until the desired temperature in the reboiler liquid indicated the lowest possible methanol concentration.

The reboiler liquid temperature was then kept constant at 114°–117° C. and the level of the liquid therein maintained by continuous product withdrawal.

Periodic odor checks were made on the tail gas escaping through vent 24. Only methanol could be detected which indicated no substantial loss of formaldehyde.

The methanol condensate from the condenser was collected in a graduated cylinder and later analyzed for material balance calculations.

The total run was 6 hours. The product withdrawn through line 53 was cloudy to hazy at first and later clear.

ANALYTICAL RESULTS AND MATERIALS BALANCE

TOTAL CONDENSABLES IN HEADER GAS

| | Percent |
|---|---|
| Formaldehyde | 36.1 |
| Water | 23.0 |
| Methanol | 40.9 |

COMPOSITION OF RECOVERED METHANOL FRACTION

| | |
|---|---|
| Total quantity recovered | 2920 g. |
| Formaldehyde content | 1.1% = 32.1 g. total. |
| Water content | 7.0% = 204.4 g. total. |
| Methanol content | 91.9% = 2683.5 g. total. |

PRODUCT WITHDRAWN FROM REBOILER

| | Grams in 6 hours |
|---|---|
| Formaldehyde | 597.9 |
| Urea | 300.3 |
| Methanol | 8.6 |
| Water | 167.1 |
| Total | 1073.9 |

MATERIALS BALANCE (INERTS NEGLECTED)

| | Formaldehyde | Methanol | Water | Urea |
|---|---|---|---|---|
| Furnace gas, condensables | 630.1 | 713.9 | 401.4 | 0 |
| Methanol-urea solution | 0 | 2,260.0 | 0 | 300.0 |
| Total supplied | 630.1 | 2,973.9 | 401.4 | 300.0 |
| Recovered in product from reboiler | 598.0 | 8.6 | 167.1 | 300.0 |
| Remainder | 32.1 | 2,965.3 | 234.3 | 0 |
| Recovered with methanol | 32.1 | 2,683.5 | 204.4 | 0 |
| In tailgas to scrubbers, by difference | 0 | 281.8 | 29.9 | 0 |

CALCULATED ANALYSIS FOR AVERAGE PRODUCT (FROM MATERIALS BALANCE)

| | |
|---|---|
| Total formaldehyde | percent 55.6 |
| Urea | do 27.9 |
| Total solids (U+F) | do 83.5 |
| Methanol | do 0.8 |
| U/F, molar ratio | 1:4 |

EXAMPLE 2

The procedure and proportions of Example 1 were followed except that the operation was performed on a commercial scale, the formaldehyde-containing furnace gas was introduced at 135°–175° C., and the methanol recovered from the condenser (here the dephlegmator 22) was mixed with additional urea and with sodium hydroxide in the mixing tank 34 and returned as reflux to the top of the fractionating column. As methanol built up in the system, due to the methanol content of the formaldehyde converter gas fed through line 12, the surplus methanol was withdrawn through the methanol take-off line 29. The reboiler temperature was varied between 106° C. and 118° C.

EXAMPLE 3

The procedure and compositions of either Example 1 or 2 are used with the exception that the methanol there used is replaced by an equal weight of any one of the other alcohols shown herein and the overhead column temperature was maintained at the boiling point of the selected alcohol or somewhat higher.

EXAMPLE 4

The procedure and composition of any of the Examples 1–3 are used except that the formaldehyde converter gas supplied through line 12 is replaced by formaldehyde obtained by distilling formaldehyde from a commercial aqueous solution of formaldehyde such as one containing 37%–44% of actual formaldehyde.

EXAMPLE 5

The procedure and composition of Example 1 are used except that the urea there used is replaced by an equal weight of melamine.

The process described is economical. It gives in a single step and continuously efficient absorption of the formaldehyde, recovery and rectification of the methanol content of the converter gas, and a concentration of the formaldehyde-urea product up to 85% or so without a subsequent concentrating step.

The concentrated solution so made is useful as an intermediate product in the manufacture of urea-formaldehyde resins suitably after the addition of a further proportion of urea (or melamine if used originally) in amount to establish the ratio to formaldehyde desired in the finished aminoplast resin and also after the addition of any usual catalyst of condensation with formaldehyde.

The concentrated solutions made as described are advantageous in transportation by reducing the proportion of water to formaldehyde much below that previously used and in avoiding the separation of paraformaldehyde at low temperatures, as down to −20° C. or somewhat lower.

It is to be understood that it is intended to cover all changes and modifications of the examples of the invention herein chosen for the purpose of illustration which do not constitute departures from the spirit and scope of the invention.

We claim:

1. In the absorption of formaldehyde, the process which comprises passing formaldehyde in gaseous form upwardly through and in intimate contact with a solution of a formaldehyde acceptor selected from the group consisting of urea and melamine and dissolved in a water-alcohol medium, the alcohol being water soluble and of boiling point lower than water and the said solution descending in a column under fractionating conditions countercurrent to the upwardly rising formaldehyde, maintaining the proportion of the selected alcohol higher than that of the water in the upper part of the column and below that of the water in the lower part of the column, heating the said column at a lower part thereof and maintaining the said medium at the top of the column at about the temperature of refluxing for the said alcohol and at the bottom of the column at a point between the said temperature and the boiling point of the water in the solution at that level, continuing the passing of the formaldehyde through the acceptor solution and the said heating so that a concentrated formaldehyde-acceptor solution resulting from the action of the formaldehyde on the acceptor collects in the lower part of the column and the alcohol becomes concentrated in the upper part of the column, withdrawing the concentrated solution from the said lower part and the alcohol in vapor form from the upper part of the column, and supplying to the said column additional amounts of the acceptor as required for accepting the formaldehyde, the acceptor being introduced at a position above that of introduction of the gaseous formaldehyde.

2. The process of claim 1 in which the said acceptor is urea.

3. The process of claim 2 in which the said alcohol is methanol, the formaldehyde, methanol and water for the acceptor liquid are introduced into the said solution in part at least in the form of mixed gases and vapors from methanol conversion to formaldehyde, and the temperature of the said mixed gases and vapors is about 120°–400° C.

4. The process of claim 1 in which the formaldehyde is introduced predominantly in the monomeric unhydrated form and the said alcohol is methanol.

5. The process of claim 4 in which the said acceptor is urea, the formaldehyde and methanol are introduced into the said solution of a formaldehyde acceptor in the form of the mixed gases and vapors from methanol conversion to formaldehyde, the temperature of the mixed gases and vapors is about 120°–400° C., and a water soluble alkali is introduced into the said column at a position above that of introduction of the said mixed gases and vapors and in amount to establish the pH at about 8–12.

6. The process of claim 1 which includes heating the withdrawn concentrated formaldehyde-acceptor solution to distil therefrom any remaining alcohol.

7. The process of claim 1 which includes condensing the said alcohol withdrawn in vapor form and introducing the said additional amounts of the acceptor near the top of the column and in solution in a part at least of the alcohol after the said condensing thereof.

8. The process of claim 1 in which the said alcohol is methanol, the formaldehyde acceptor is urea, the formaldehyde and methanol are introduced into the solution of the urea in the form of the mixed gases and vapors from methanol conversion to formaldehyde, and sodium hydroxide is introduced into the said column at a position above that of introduction of the formaldehyde and methanol into the solution of urea and in amount to establish the pH at about 8–12.

References Cited in the file of this patent
UNITED STATES PATENTS

| | | |
|---|---|---|
| 2,415,705 | Rohner et al. | Feb. 11, 1947 |
| 2,652,377 | Kise | Sept. 15, 1953 |